(12) United States Patent
Venna et al.

(10) Patent No.: US 12,529,811 B2
(45) Date of Patent: Jan. 20, 2026

(54) DETECTION AND QUANTIFICATION OF SAND FLOWS IN A BOREHOLE

(71) Applicant: HALLIBURTON ENERGY SERVICES, INC., Houston, TX (US)

(72) Inventors: Atchyuta Ramayya Venna, Houston, TX (US); Batakrishna Mandal, Sugar Land, TX (US); John Philip Granville, Humble, TX (US); Federico Combis Lucas, Jr., Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 903 days.

(21) Appl. No.: 16/409,652

(22) Filed: May 10, 2019

(65) Prior Publication Data

US 2020/0355838 A1    Nov. 12, 2020

(51) Int. Cl.
*G01V 1/30*    (2006.01)
*E21B 47/107*  (2012.01)
*G01V 1/42*    (2006.01)

(52) U.S. Cl.
CPC .......... *G01V 1/306* (2013.01); *E21B 47/107* (2020.05); *G01V 1/42* (2013.01); *E21B 2200/22* (2020.05); *G01V 2210/12* (2013.01)

(58) Field of Classification Search
CPC ...... G01V 1/306; G01V 1/42; G01V 2210/12; G01V 2200/16; G01V 2210/21; G01V 2210/43; G01V 2210/62; G01V 1/50; E21B 47/107; E21B 2200/22; E21B 2200/20

See application file for complete search history.

(56) References Cited

U.S. PATENT DOCUMENTS

| 3,854,323 | A  | * | 12/1974 | Hearn ................ E21B 47/107 73/152.32 |
| 6,531,694 | B2 |   | 3/2003  | Tubel et al. |
| 8,622,128 | B2 | * | 1/2014  | Hegeman ............ E21B 47/10 166/264 |
| 9,784,862 | B2 |   | 10/2017 | Childers et al. |
| 2005/0126777 | A1 |   | 6/2005  | Rolovic et al. |

(Continued)

FOREIGN PATENT DOCUMENTS

| CN | 102116150 A1 | 7/2011 |
| WO | 2002023169 A1 | 3/2002 |

(Continued)

OTHER PUBLICATIONS

Shuck, L. Z., and T. W. Keech. "Noise Characteristics of Oil Wells and Reservoirs." Fall Meeting of the Society of Petroleum Engineers of AIME. OnePetro, 1974. (Year: 1974).*

(Continued)

*Primary Examiner* — Michael Edward Cocchi
(74) *Attorney, Agent, or Firm* — NOVAK DRUCE CARROLL LLP

(57) ABSTRACT

Systems, methods, and computer-readable media are provided for detecting sand in a production flow. An example method can include receiving acoustic field data generated by at least one acoustic sensor on a downhole tool lowered into a borehole of a production flow. The method can further include inputting the acoustic field data into an acoustic sand detection model and generating a sand flow signal based on output on the acoustic sand detection model.

20 Claims, 10 Drawing Sheets

(56) References Cited

U.S. PATENT DOCUMENTS

| | | | |
|---|---|---|---|
| 2005/0216242 A1* | 9/2005 | Flax | G05B 17/02 |
| | | | 703/9 |
| 2012/0096922 A1* | 4/2012 | Ellson | G01F 1/666 |
| | | | 73/61.75 |
| 2013/0175030 A1* | 7/2013 | Ige | G05B 15/02 |
| | | | 700/282 |
| 2016/0222741 A1* | 8/2016 | Lovorn | E21B 34/00 |
| 2018/0010429 A1* | 1/2018 | Willberg | E21B 43/12 |
| 2018/0202264 A1 | 7/2018 | Sarduy et al. | |
| 2019/0120044 A1* | 4/2019 | Langnes | E21B 47/135 |
| 2020/0174149 A1* | 6/2020 | Thiruvenkatanathan | |
| | | | G01V 1/282 |

FOREIGN PATENT DOCUMENTS

| | | | | |
|---|---|---|---|---|
| WO | 2017174750 A3 | 10/2017 | | |
| WO | WO-2018057029 A1 * | 3/2018 | | E21B 47/107 |

OTHER PUBLICATIONS

Stein, Nathan, et al. "Sand production determined from noise measurements." Journal of Petroleum Technology 24.07 (1972): 803-806. (Year: 1972).*

Silkina, Tatiana. Application of distributed acoustic sensing to flow regime classification. MS thesis. Institutt for petroleumsteknologi og anvendt geofysikk, 2014. (Year: 2014).*

Pendrel, John. "Seismic inversion—The best tool for reservoir characterization." CSEG Recorder 26.1 (2001): 18-24. (Year: 2001).*

Han, Gang, et al. "A comprehensive study of sanding rate from a gas field: From reservoir to completion, production, and surface facilities." SPE Journal 16.02 (2011): 463-481. (Year: 2011).*

Wang, Kai, et al. "Acoustic sensor approaches for sand detection in sand-water two-phase flows." Powder Technology 320 (2017): 739-747. (Year: 2017).*

International Search Report and Written Opinion for International application No. PCT/US2019/049432, mailed Feb. 5, 2020, 8 pages.

* cited by examiner

DETECTION AND QUANTIFICATION OF SAND FLOWS IN A BOREHOLE

TECHNICAL FIELD

The present disclosure relates to the field of acoustic investigation techniques for determining characteristics of a subterranean borehole.

BACKGROUND

Oil and gas operations involve accessing underground hydrocarbon reservoirs contained within subterranean formations. As part of ordinary operations, drilling is conducted to form a borehole in order to access desired sites. Once a borehole is formed, ordinarily a casing is provided within at least a portion of the borehole in order to define and stabilize the borehole for subsequent drilling or hydrocarbon retrieval. The borehole casing is commonly formed by steel piping set in place with the introduction of cement between the borehole wall and the piping. Maintaining the integrity of the casing and borehole is desirable during drilling and well completion, and the casing and borehole must withstand attack by borehole fluids as well as the high temperatures and pressures that are present downhole. The casing affords protection against various borehole fluids or other contaminates from entering the borehole or moving to unwanted zones. For example, proper protection by the casing can prevent accumulation of fluids in undesirable locations or zones, or flow of fluids from one zone to another, or to the surface. Other dangers include movement of fluids to contaminate the water table or creation of hazardous conditions such as explosive mixtures. The casing may be perforated across one or more production zones to allow production fluids to enter the casing bore. Some well bores are uncased and an open face is established across the oil or gas bearing zone. Such open borehole (uncased) arrangements are utilized, for example, in water wells, test wells, and horizontal well completions.

During production of the formation fluid, particulate materials such as sand may also swept into the flow path and may erode production components in the flow path, plug flow lines, damage downhole and surface equipment, cause production downtime, or cause other events that are detrimental to hydrocarbon capture processes. Also, if the particulate matter is produced to the surface, it must be removed from the hydrocarbon fluids by processing equipment at the surface.

One or more screens or filters of various types may be used to reduce the amount of sand swept into the flow path. For example, a sand screen may be installed in the flow path between the production tubing and the perforated casing (cased) or the open well bore face (uncased). The annulus around the screen may be packed with gravel (e.g., a gravel pack) which acts as a filter to reduce the amount of sand reaching the sand screen.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
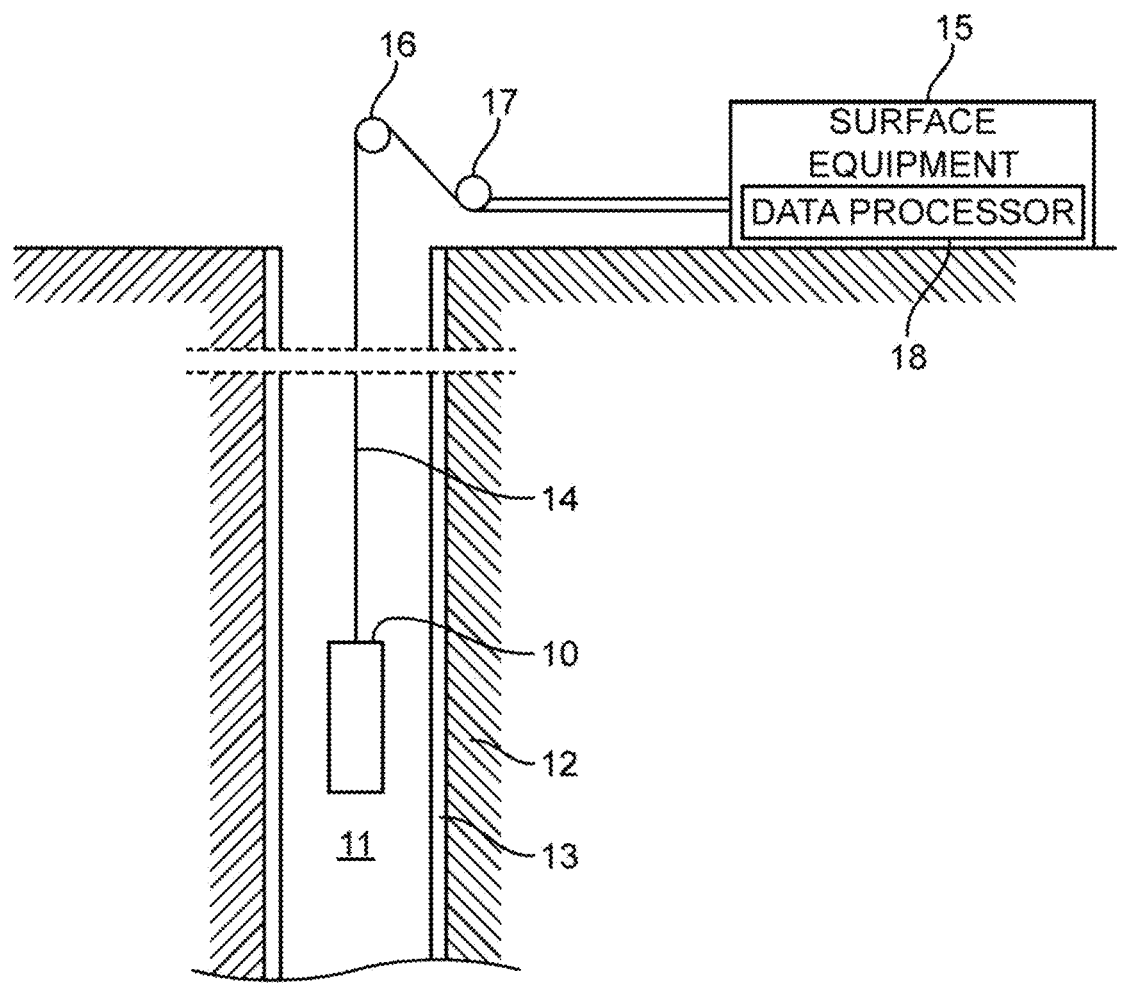
FIG. 1 illustrates an example environment in which a system for detecting a sand flow in a tubular structure may operate, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

As noted above, various screens or filters may be used to reduce the amount of sand that enters the production flow. However, the sand that comes in contact with the screens or filters also erodes the screens and filters over time, causing damage. Any small damage to the various screens or filters may allow sand to enter the production tubing and lead to further erosion or damage to the screens, filters, casings, and/or production equipment. The presence of sand also leads to the plugging up of production lines, the jamming of equipment, or the scaling back of the production flow. Although sand in the production flow may be detected based on inspection of the flow at the surface, some sand may not reach the surface and the sand that reaches the surface may not be indicative of the level of damage to the screens and filters. Furthermore, surface inspection of the flows is unable to determine the location of where the sand is entering the production flow. Location information may be useful when repairing wells and/or managing well production.

Accordingly, it would be advantageous to detect sand flows into the production tubing and detect the sand flow at a relatively early stage in order to prevent further erosion and further increase of the sand flow over time. Increased sand flow can also clog up or slow down surface equipment and cause production to be scaled back or shut down.

Aspects of the subject technology are directed to a systems and processes detecting a sand flow in a tubular structure. A system may be configured to collect acoustic data from one or more acoustic sensors on a downhole tool lowered into a borehole and generating a sand flow signal based on the collected acoustic data and a sand detection model. The sand flow signal may indicate a presence of sand and/or an amount of sand in the production flow. By using acoustic data from acoustic sensors on a downhole tool lowered into a producing borehole, the system is able to detect sand flows at an earlier stage compared to surface detection techniques and with greater accuracy.

Based on the sand flow signal, well management decisions may be made. For example, a production engineer may make a decision on scaling back production in order to minimize erosion and/or damage to sand filters or equipment, increasing production if minimal sand is detected, plugging a production zone and/or leak, and/or repairing or replacing sand filters or equipment. A number of sand flow signals may be generated over and compared in order to track the levels of sand in the production flow over time and make additional well management decisions.

As used herein, the term "sand" may refer to non-hydrocarbon particulate material of various types, compositions, combinations, and mixtures. The composition of sand generally depends on the earth in which a borehole is drilled and may include rocks, clay, gravel, quartz, silt, calcium carbonate, silica, organic and inorganic matter, etc. In some cases, the sand may also include some drilling byproducts.

FIG. 1 illustrates an example environment in which a system for detecting a sand flow in a tubular structure may operate, in accordance with various aspects of the subject technology. In order to access underground hydrocarbon reservoirs contained within subterranean formations, a borehole 11 may be drilled into the earth 12. Once a borehole 11 is formed, a casing 13 may be used to define and stabilize the borehole 11 for subsequent drilling or hydrocarbon retrieval. The casing 13 may be perforated across one or more production zones to allow production fluids to enter the casing bore. In some environments (e.g., test wells and horizontal well completions), some boreholes or portions of a borehole may be uncased. Various filters and screens may be used to reduce the amount of sand and other particulate material from entering the production flow via uncased portions of the borehole 11, perforated portions of the borehole casing 13, cracks, leaks, or other sources.

However, even with preventative measures, sand and other particulates matter may still enter the production flow. The presence of sand may erode production components in the flow path, plug flow lines, damage downhole and surface equipment, cause production downtime, or cause other events that are detrimental to hydrocarbon capture processes. Also, if the particulate matter is produced to the surface, it must be removed from the hydrocarbon fluids by processing equipment at the surface.

According to various aspects of the subject technology, a tool 10 may be used to detect inflows of sand in the borehole 11. The tool may include one or more sensors configured to generate vibrational data in response to detected vibration in the environment. The detected vibrations may be caused by sand or other particulates in the borehole hitting the tool 10, the casing 13, and/or other objects in or around the borehole 11. Other vibrations caused by other events may have different vibrational signature and, as a result, can be filtered out. For example, vibrations caused by fluid flows (e.g., water or hydrocarbons) may be at lower strengths, have different frequencies, and/or have different characteristics such that they may be distinguished from vibrations caused by sand and other particulates.

According to some aspects, the vibrational data may be acoustic data collected by one or more acoustic sensors (e.g., hydrophones) in response to sound waves which may or may not be at frequencies perceptible by humans. Other types of sensors may include geophones, accelerometers, fiber optic cables, etc. Furthermore, a combination of different sensors may also be used on the tool 10. Various configurations of the one or more sensors may also be deployed on the tool 10. For example, in one implementation, a linear array of eight hydrophones may be placed four inches apart on the tool 10. In other implementations, a different number of sensors, different types of sensors, and/or different placements of sensors may be used on one tool 10 or multiple tools.

The tool 10 may be lowered into the borehole 11 by a conveyance 14 and can be raised through the use of equipment 15 over a wheel 16. While the tool 10 is in the borehole 11, the tool 10 may collect vibrational data (e.g., acoustic data) The conveyance may comprise wireline, slickline, coiled tubing, or another downhole conveyance. The depth of the tool 10 can be determined through a depth gauge 17. A data processor 18 may be communicably coupled to the tool, within the tool itself, positioned at the surface, on one or more remote servers accessible via a network, or a combination of these. In the environment illustrated in FIG. 1, the data processor 18 may be communicably coupled to the tool 10 through the conveyance 14, and the vibrational data from the sensors on the tool 10 may be transmitted to the data processor 18 through the conveyance 14.

The data processor 18 processes the vibrational data (e.g., acoustic data) to provide information about the presence and/or quantity of sand in the borehole 11. For example, the data processor 18 may determine whether the detected vibrational data can be associated with the presence of sand in the production flow and/or a particular level of sand in the production flow. This information may be used to manage well operations and maintenance. According to some aspects of the subject technology, the data processor 18 may apply a vibrational sand detection model to the received vibrational data to generate an output that is used to determine a sand flow signal. The sand flow signal may be provided to an engineer, a well management system, a well maintenance system, or other component. For example, based on the sand flow signal, a decision may be made to scale back production in order to minimize erosion and/or damage to sand filters or equipment, increase production if minimal sand is detected, plug a production zone and/or leak, or repair sand filters, screens, or equipment.

According to some aspects, the tool 10 may be moved through in the borehole 11 in various directions. As the sensors on the tool 10 receive vibrational signals from a source of the vibrational data, the data processor 18 may also records data about the depth of the tool 10 in order to determine the depth of the source. Furthermore, the tool 10 may be sent down the borehole 10 a number of trips over a long period of time. Each trip may be logged and time-stamped in order to generate multiple sand flow signals over time. The sand flow signals may be compared in order to track the levels of sand in the production flow over time, identify trends, and make additional well management decisions.

As noted above, the data processor 18 may use a vibrational sand detection model and the vibrational data to determine the presence and/or quantity of sand in the borehole 11. As will be discussed in further detail, the vibrational sand detection model may be generated based on one or more machine learning techniques, in accordance with various aspects of the subject technology. The vibrational sand detection model may be generated during a training phase that may be performed by the data processor 18. However, in many aspects of the subject technology, the training phase is performed by different computing devices. For example, the training phase may be performed by one or more server or computers that are remote from the data processor 18 and well site. Different portions of the training phase may also be performed by different computing devices at one or more locations. In some cases, a cloud platform or hybrid cloud platform may be used.

Figure 2A:
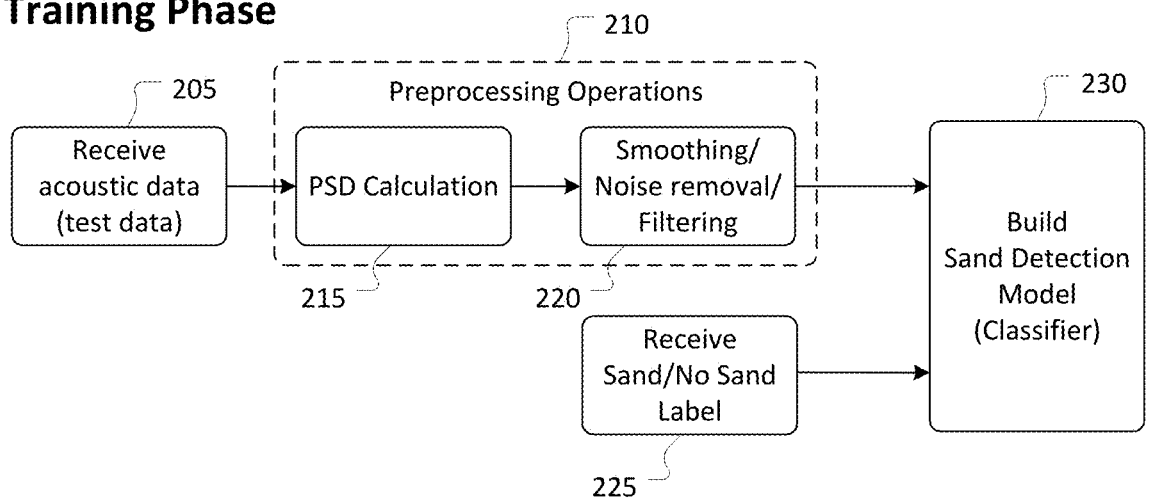
FIGS. 2A and 2B are flow diagrams showing a training phase for generating a sand detection model and a detection phase for using the sand detection model, in accordance with various aspects of the subject technology.
Figure 2B:
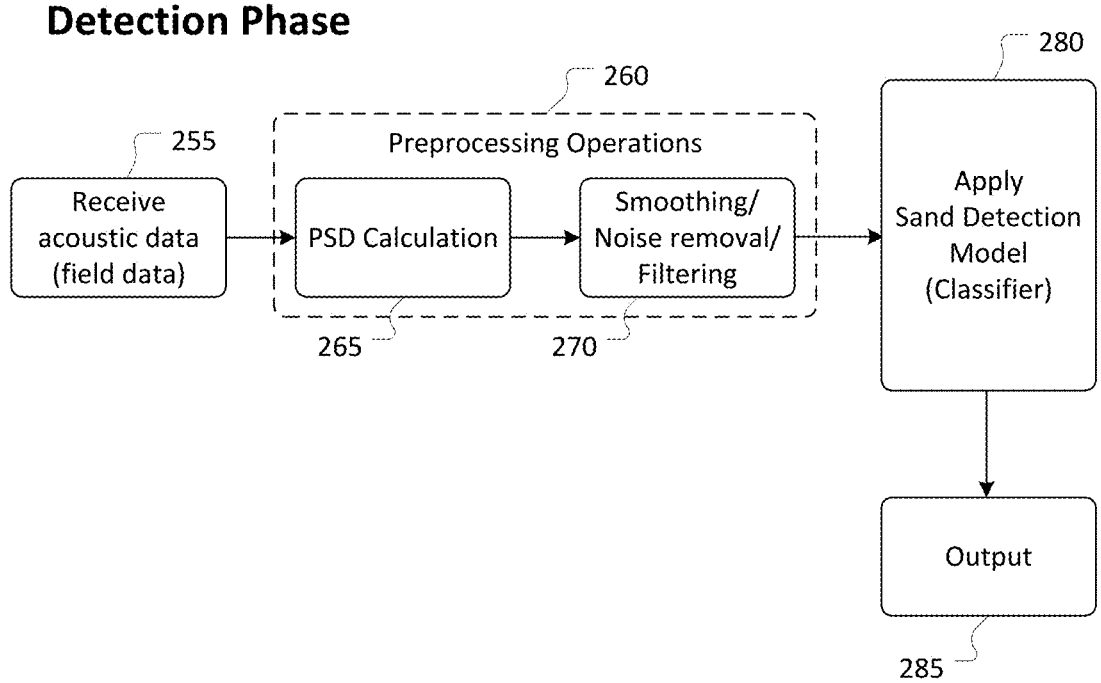

FIGS. 2A and 2B are flow diagrams showing a training phase for generating a sand detection model and a detection phase for using the sand detection model, in accordance with various aspects of the subject technology. For the purposes of illustration, FIGS. 2A and 2B are described with respect to certain data (e.g., acoustic data), labels, data transformations, preprocessing steps, and machine learning models. However, other types of data (e.g., vibrational data), labels, data transformations, preprocessing steps, and machine learning models may also be used.

A set of test data may be collected in order to build the sand detection model. The test data may include sensor data that has been collected along with associated label data. The sensor data may include the same type of data collected by the sensors and/or tool 10 of FIG. 1. For example, the sensor data may include acoustic data (or other vibrational data). However, in other variations, the tool 10 of FIG. 1 may have additional sensors and the data collected by these sensors may similarly be included in the sensor data.

Label data may include a set of values that are associated with a set of sensor data. In the simplified example of FIG. 2A, the label data for each set of sensor data may include values for sand concentration, flow rate, flow velocity, and orifice size. The sand concentration values may represent an amount of sound per volumetric unit or a percentage of sand in a test flow. The flow rate values may represent the rate at which the test flow is moving (e.g., in gallons per minute). The orifice size may represent the size of a crack, leak, or opening in which sand can enter the test flow. For the sake of simplicity, the orifice size can be assumed to be circular and be measured as an inner diameter value (e.g., 0.275 inches, 0.5 inches. However, in other variations, specific shapes, geometries, and other characteristics of the orifice can be represented and recorded in the label data. Additional label data may include an incline or decline degree for the test flow, a borehole diameter, sand composition information, fluid composition information, viscosity information of the test flow, temperature, or any other characteristics that may or may be recorded. For some label data, it may be apparent that there might be some affect the recorded sensor data. However, for other label data, it may not appear (at least upon first glance) to affect the recorded sensor data.

According to some aspects of the subject technology, the test data may be generated in a controlled environment (e.g., a lab) or in the field in production environments. In a controlled environment, a number of simulations that approximate the conditions in a production borehole may be prepared and run. For example, a tubular structure that approximates a borehole or an actual test borehole may be used. The tubular structure or test borehole may be similar to, approximate, or be of the same composition as the borehole used in the field (e.g., borehole 11 of FIG. 1). Similarly, the same or similar tool and sensor configuration as the tool used in the field (e.g., tool 10 of FIG. 1) may be used to record sensor data.

Parameters that correspond to label data for each simulation may be set. For example, the parameters may include values for sand concentration, flow rate, and orifice size. Once set, the simulation may be run with the tool recording sensor data (e.g., acoustic data) in the tubular structure in accordance with the set parameters. For example, sand may be injected through an orifice of the specified size into a test flow at the specified flow rate to achieve the specified sand concentration. The recorded sensor data for the simulation is paired with the label data (e.g., the parameters of the simulation) and stored as a unit (e.g., a simulation record or other data structure representing the simulation). A large number of simulations may be run to test different combinations of parameters and each combination of parameters may be simulated one or more times. Data for the simulations may be stored in a database as test data and used to generate the sand detection model.

In a non-controlled or field environment, test data may similarly be collected without simulation. However, instead of being able to control the parameters of each simulation, sensor data may be collected from a tool in a production environment and label data associated with the sensor data may be identified or determined. For example, after or while sensor data is being collected, samples of the production flow may be taken to determine a sand concentration parameter/label associated with the collected sensor data, other sensors near the tool or at the surface may be able to calculate a flow rate associated with the collected sensor data, and inspection of the borehole with a probe or during repair or replacement activities can determine orifice size. In some cases, not all parameters in controlled environments and non-controlled environments may be the same and different techniques may be used to identify the various parameters in a non-controlled environment. Similar to controlled environments, in non-controlled environments, a large sampling of test data may be collected that represents different combinations of parameters. The test data collected may be stored in a database and used to generate the sand detection model.

FIG. 2A is a flow diagram of the training phase for generating the sand detection model. The training phase may be performed by one or more devices that make up a training system. The training system may store the set of test data and/or receive the test data over a network. The test data includes sensor data and label data. Although the sensor data may include any data collected by a tool, for the sake of illustration, the discussion of FIG. 2A focuses on acoustic data as an example.

At step 205 of FIG. 2A illustrates the training system receiving the acoustic data portion of the test data. The acoustic data may initially be represented as a raw waveform. In some variations, one or more preprocessing step 210 must be performed on the sensor data before it is used to generate the sand detection model. For example, at step 215, the training system may calculate the power spectral density (PSD) or power spectrum of each acoustic waveform. The PSD gives a measure of the acoustic power at a particular frequency. The PSD is one convenient metric for comparing acoustic signals in the frequency domain.

Figure 3:
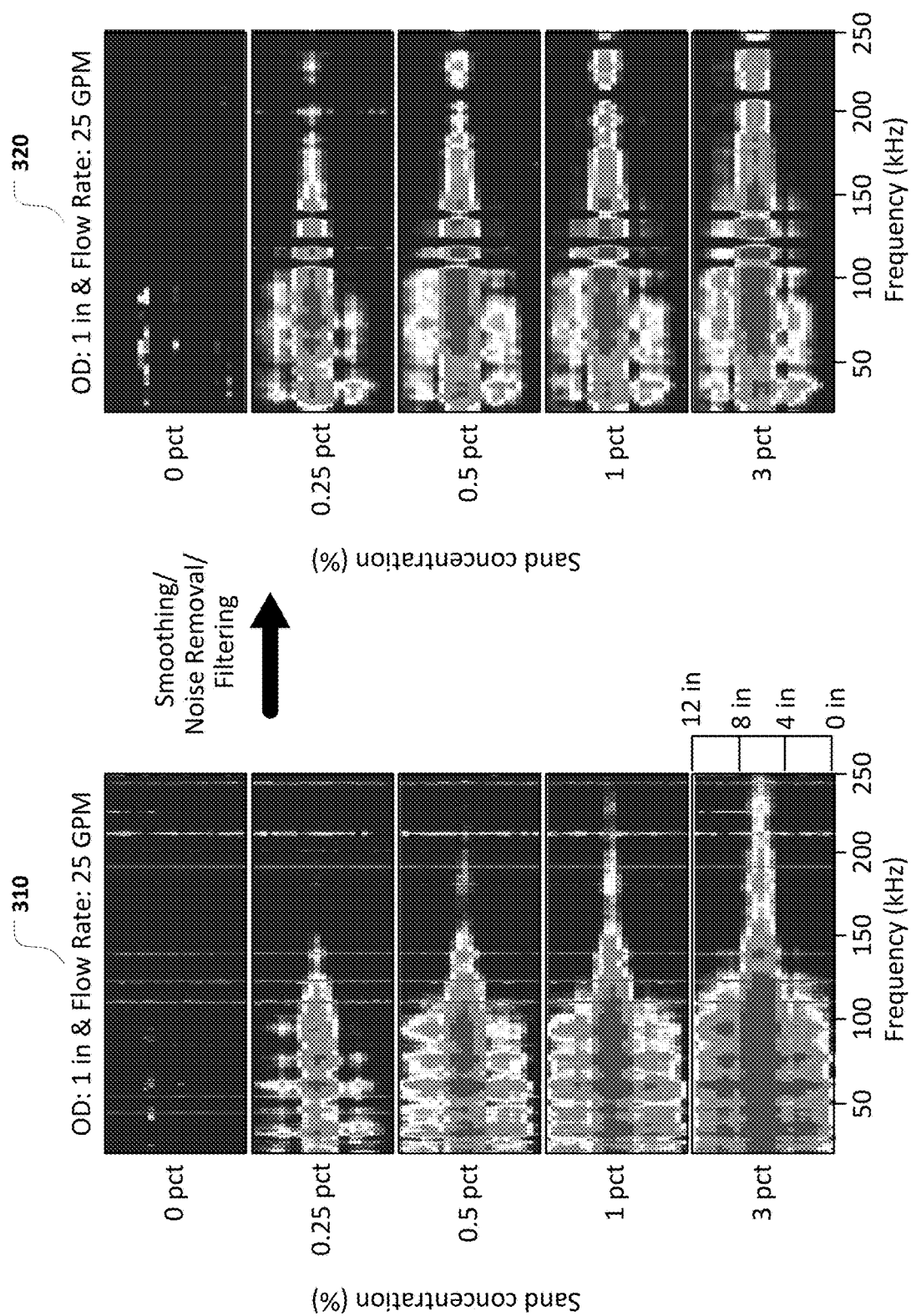
FIG. 3 is a chart of different power spectral density measurements for acoustic waveforms, in accordance with various aspects of the subject technology.

FIG. 3 is a chart illustrating different power spectral density (PSD) measurements for acoustic waveforms, in accordance with various aspects of the subject technology. The left column 310 shows a sampling of 5 different visualizations of PSD measurements for 5 different sets of labels (e.g., parameters). More specifically, all 5 visualizations of PSD measurements are associated with an orifice size of 1 inch (inner diameter) and a flow rate of 25 gallons per minute (gpm). Each visualization, however, is associated with a different sand concentration label (e.g., 0, 0.25, 0.5, 1, or 3 percent). For each of the 5 sand concentration labels shown, 25 PSD measurements are calculated each from a different position (e.g., from 0-12 inches in ½ inch increments) of a hydrophone. As a result, a total of 125 PSD measurements (25×5) are made for the visualizations shown in the left column. Although the visualizations display up to up to 250 kHz, additional data may be collected (e.g., up to 2.5 MHz) but filtered out.

In some cases, the PSD measurements (as is seen in column 310 of FIG. 3) may be noisy or unclear due to background acoustic noise, tool settings, production flow noise, electronics noise, or other unknowns. The training system may perform additional preprocessing steps 210 on the PSD measurements to improve the data. For example, at step 220 of FIG. 2A one or more smoothing, noise removal, and/or filtering techniques may be applied to each PSD measurement. For example, a PSD measurement may be smoothed by averaging it over the acquisition.

This smoothed PSD measurement may still contain significant noise from production flow interference or electronics interference. To remove this noise, sensor data (e.g., acoustic data) recorded at a distance from the location associated with the current sensor data may be subtracted from the current sensor data to remove production flow noise and/or electronics noise. The subtraction may occur based on the acoustic waveform or based on the resulting PSD measurements. For example, acoustic data may be recorded at a location near the orifice (e.g., near the sand flow source) or at another location that serves as a point of reference. A PSD measurement (PSD_flow) may be calculated based on the acoustic data at the point of reference. Similarly, acoustic data may be recorded at a distance (e.g., 1 foot, 5 feet, etc.) away from the point of reference and a PSD measurement (PSD_far) may be calculated based on the acoustic data at the distance away from the point of reference. The distance away from the point of reference may be configured to target an area where the production flow dominates. The normalized PSD measurement (PSD_normalizedflow) for the point of reference may then be as follows:

$$PSD\_normalizedflow = PSD\_flow - PSD\_far$$

Additionally, one or more filtering operations may also be performed. For example, as seen in the left column 310 of FIG. 3, the PSD measurements may have vertical bands at some frequencies which are due to tool electronics noise. These vertical bands may be removed. Furthermore, noise below a certain frequency (e.g., 2 kHz) which may be attributed to production flow may also be removed or filtered out. The right column 320 of FIG. 3 shows the result of the one or more smoothing, noise removal, and/or filtering operations performed on the PSD measurements of the right column 310 at step 220. In other aspects of the subject technology, the preprocessing operations may also include principal component analysis (PCA) applied to the PSD measurements to identify dominant features. These dominant features may be used as training input for the machine learning algorithm.

At step 225, the training system may also receive the label data component of the test data. In the illustrative example of FIG. 2A, the label data may be in the form of a simple sand label that specifies whether there is sand in the flow (e.g., a "sand" label or "no sand" label based on whether acoustic data is associated with sand in the flow). In other variations, the label data may include other parameters such as sand concentration, flow rate, flow velocity, and orifice size.

The processed PSD measurements from step 220 and the sand label from step 225 may then be used to build the sand detection model at step 230. In the example of FIG. 2A, the sand detection model is a binary classifier. However, as will be discussed in further detail, other types of models may also be used. A number of different techniques, including machine learning techniques may be used to build the sand detection model. For example, support vector machines, artificial neural networks, K-nearest neighbors, regression techniques, decision tree learning, random forest regressors, random forest classifiers, or a combination of different techniques may be used to generate the sand detection model.

In the example of FIG. 2A, a supervised learning algorithm such as a random forest classifier may be used to generate the sand detection model. To illustrate, the test data may be randomly partitioned into 10 equal size subsets. Of the 10 subsets, the first nine subsets may be used for training the sand detection model and the remaining subset is retained as a validation dataset for testing the sand detection model. The training process may be repeated 10 times, with each of the 10 subsets used exactly once as the validation dataset. This is effective in estimating the performance of the sand detection model when applying it to new data (generalization performance) and in order to avoid problems like overfitting. A confusion matrix is computed using all of the validation data performance results from the 10-fold cross validation method. After training is completed, the sand detection model can be tested on a blind dataset for additional validation.

FIG. 2B is a flow diagram of the detection phase for using the sand detection model generated in FIG. 2A. The detection phase may be performed by one or more devices that make up a detection system. For example, the detection system may embody or include data processor 18 of FIG. 1, another computing device at on-site near the borehole, a remote computing system accessible via a network, or a combination. The sand detection model may be sent to the detection system via a network or transferred to and stored on the detection system using other means.

At step 255, the detection system may receive sensor data from a tool (e.g., tool 10 of FIG. 1) used in the field. Although the sensor data may include any data collected by the tool, for the sake of illustration, the discussion of FIG. 2B focuses on acoustic data as an example. The acoustic data may initially be represented as a raw waveform and may require transformation into a format that can be applied to the sand detection model. Accordingly, one or more preprocessing operations 260 may be performed on the acoustic data. For example, at step 265, the detection system may calculate the power spectral density (PSD) or power spectrum of the acoustic data received from the tool. At step 270, the detection system may perform additional preprocessing steps 260 on the PSD measurement to improve the data. For example, similar to step 220 of FIG. 2A, one or more smoothing, noise removal, and/or filtering techniques may be applied to the PSD measurement.

At step 280, the detection system may input the processed PSD measurement into the sand detection model (e.g., a random forest classifier model) and generate an output from the sand detection model at step 285. The output may be in the form of a sand flow signal that indicates that sand is likely present or not present in the flow based on the received acoustic data from the tool. The sand flow signal may be provided to an engineer, a well management system, a well maintenance system, or other component. For example, a production engineer may make a decision on scaling back production in order to minimize erosion and/or damage to sand filters or equipment, increasing production if minimal sand is detected, plugging a production zone and/or leak, and/or repairing or replacing sand filters or equipment.

Although FIGS. 2A and 2B show a training phase for generating a binary classifier for sand detection and a detection phase for using the binary classifier, other types of models (e.g., regressors) may also be generated and used instead of or in addition to the binary classifier.

Figure 4A:
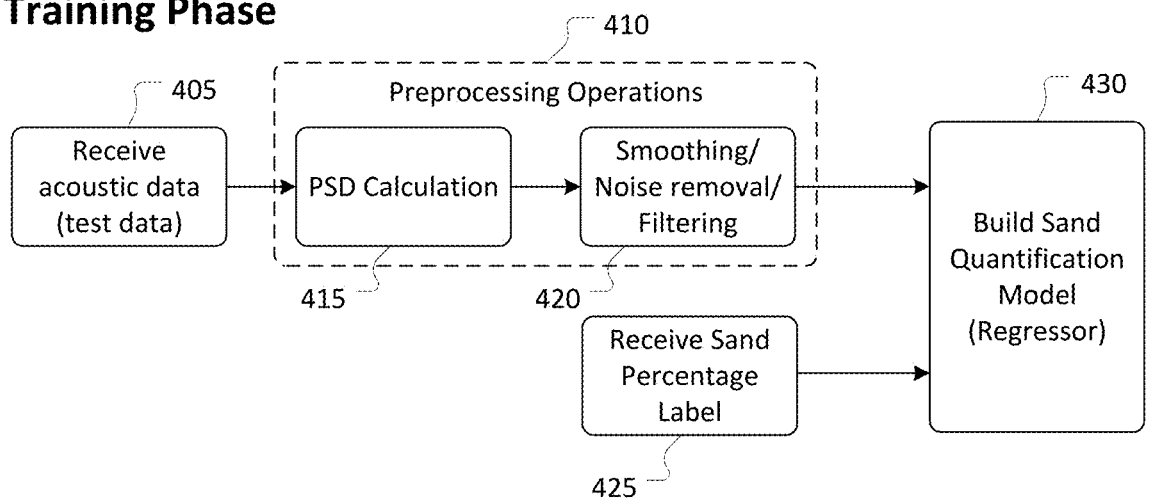
FIGS. 4A and 4B are flow diagrams showing a training phase for generating a sand quantification model and a estimation phase for using the sand quantification model, in accordance with various aspects of the subject technology.
Figure 4B:
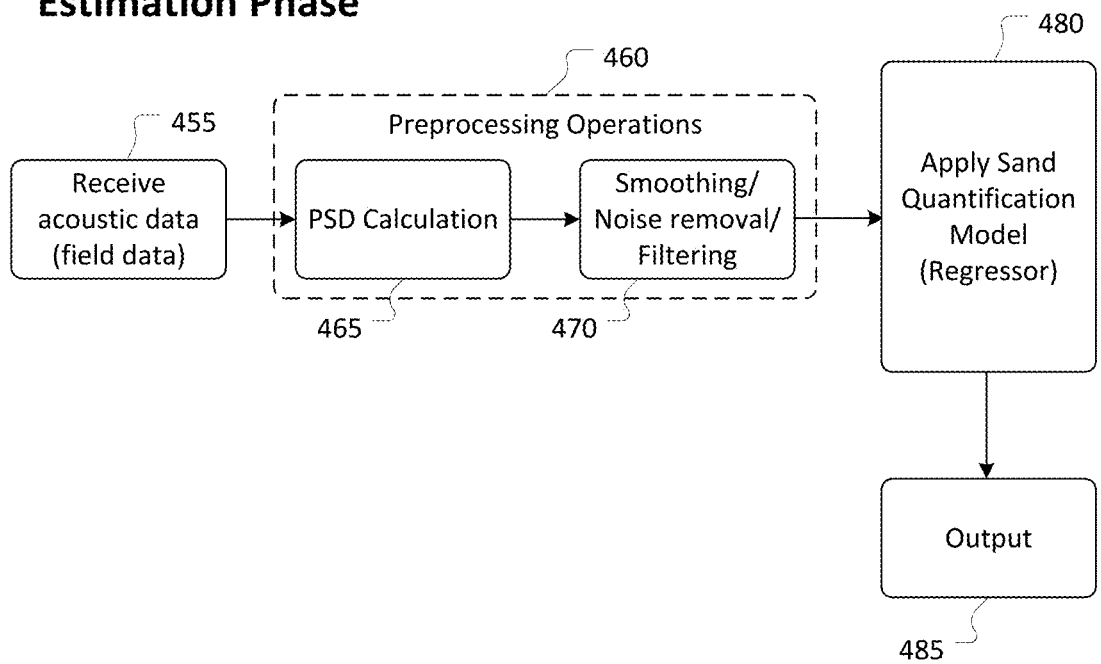

FIGS. 4A and 4B are flow diagrams showing a training phase for generating a sand quantification model and an estimation phase for using the sand quantification model, in accordance with various aspects of the subject technology. The sand quantification model may be a regressor model (e.g., a random forest regressor). For the purposes of illustration, FIGS. 4A and 4B are described with respect to certain data (e.g., acoustic data), labels, data transformations, preprocessing steps, and machine learning models. However, other types of data (e.g., vibrational data), labels, data transformations, preprocessing steps, and machine learning models may also be used.

FIG. 4A is a flow diagram of the training phase for generating the sand quantification model. The training phase may be performed by one or more devices that make up a training system. In some variations, the training system may be separate from the devices generating the training data and/or using the sand quantification model. The test data includes sensor data and label data. The sensor data may include acoustic data as well as other types of sensor data. At step 405 the training system receives the acoustic data portion of the test data.

The acoustic data may initially be represented as a raw waveform. Although some variations may build and use models based on acoustic waveforms or energy conversions of the acoustic waveforms, in the variation illustrated in FIGS. 4A and 4B, the models are based on PSD measurements of acoustic waveforms. At step 410, the training system performs a number of preprocessing operations to prepare the model input for generating the sand quantification model. At step 415, the training system may calculate the power spectral density (PSD) or power spectrum of each acoustic waveform in the test data and perform one or more smoothing, noise removal, and/or filtering operations on each PSD measurement at step 420.

At step 425, the training system may also receive the label data component of the test data. The label data may include a measure of a quantity or concentration of sand associated with a particular set of acoustic data. In the illustrative example of FIG. 4A, the label data may be in the form of a percentage of sand associated with each set of acoustic data. In other variations, the label data may include other parameters such as flow rate and orifice size.

The processed PSD measurements from step 420 and the sand percentage label from step 425 may then be used to build the sand quantification model at step 430. In the example of FIG. 4A, the sand quantification model is a random forest regressor model. However, other types of models may also be used. The test data may be randomly partitioned into 10 equal size subsets. Of the 10 subsets, the first nine subsets may be used for training the sand quantification model and the remaining subset is retained as a validation dataset for testing the sand quantification model. The training process may be repeated 10 times, with each of the 10 subsets used exactly once as the validation dataset. This is effective in estimating the performance of the sand quantification model when applying it to new data (generalization performance) and in order to avoid problems like overfitting. Root Mean Squared Error (RMSE) is computed for all the validation data results from 10-fold cross validation. Other metrics that may be used to evaluate regression model performance may include Mean Absolute Error (MAE), or Mean Squared Error (MSE). After training is completed, the sand quantification model can be tested on a blind dataset for additional validation.

FIG. 4B is a flow diagram of the estimation phase for using the sand quantification model generated in FIG. 4A. The estimation phase may be performed by one or more devices that make up an estimation system. For example, the estimation system may embody or include data processor 18 of FIG. 1, another computing device at on-site near the borehole, a remote computing system accessible via a network, or a combination. In some embodiments the estimation system may be a detection system as described throughout the specification. The sand quantification model may be sent to the estimation system via a network or transferred to and stored on the estimation system using other means.

At step 455, the estimation system may receive sensor data from a tool (e.g., tool 10 of FIG. 1) used in the field. The sensor data may include acoustic data from sensors on the tool. The acoustic data may initially be represented as a raw waveform and may require transformation into a format that can be applied to the sand quantification model. Accordingly, one or more preprocessing operations 460 may be performed on the acoustic data. For example, at step 465, the estimation system may calculate the power spectral density (PSD) or power spectrum of the acoustic data received from the tool. At step 470, the estimation system may perform additional preprocessing steps 460 on the PSD measurement to improve the data such as one or more smoothing, noise removal, and/or filtering techniques.

At step 480, the estimation system may input the processed PSD measurement into the sand quantification model which, in the example of FIG. 4B is a random forest regressor. At step 485, output is generated from the sand quantification model. The output may be in the form of a sand flow signal that indicates an estimate of the amount, concentration, or percentage of sand that is present in the flow based on the received acoustic data from the tool. In other variations, additional input into the model may include production flow rate or additional sensor data and additional output may include, for example, orifice size or sand flow rate. The sand flow signal may be provided to an engineer, a well management system, a well maintenance system, or other component. For example, a production engineer may make a decision on scaling back production in order to minimize erosion and/or damage to sand filters or equipment, increasing production if minimal sand is detected, plugging a production zone and/or leak, and/or repairing or replacing sand filters or equipment.

Figure 5A:
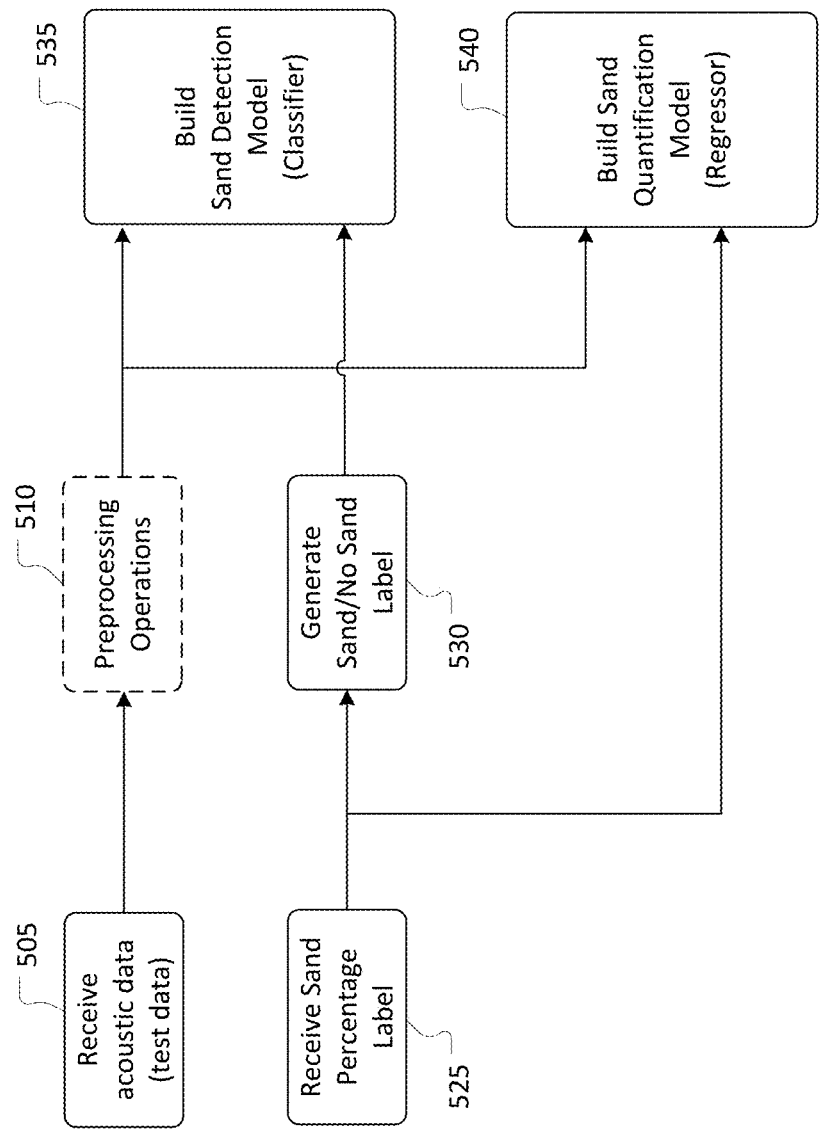
FIGS. 5A and 5B are flow diagrams showing a training phase for a dual model system and a detection phase for using the dual model system, in accordance with various aspects of the subject technology.
Figure 5B:
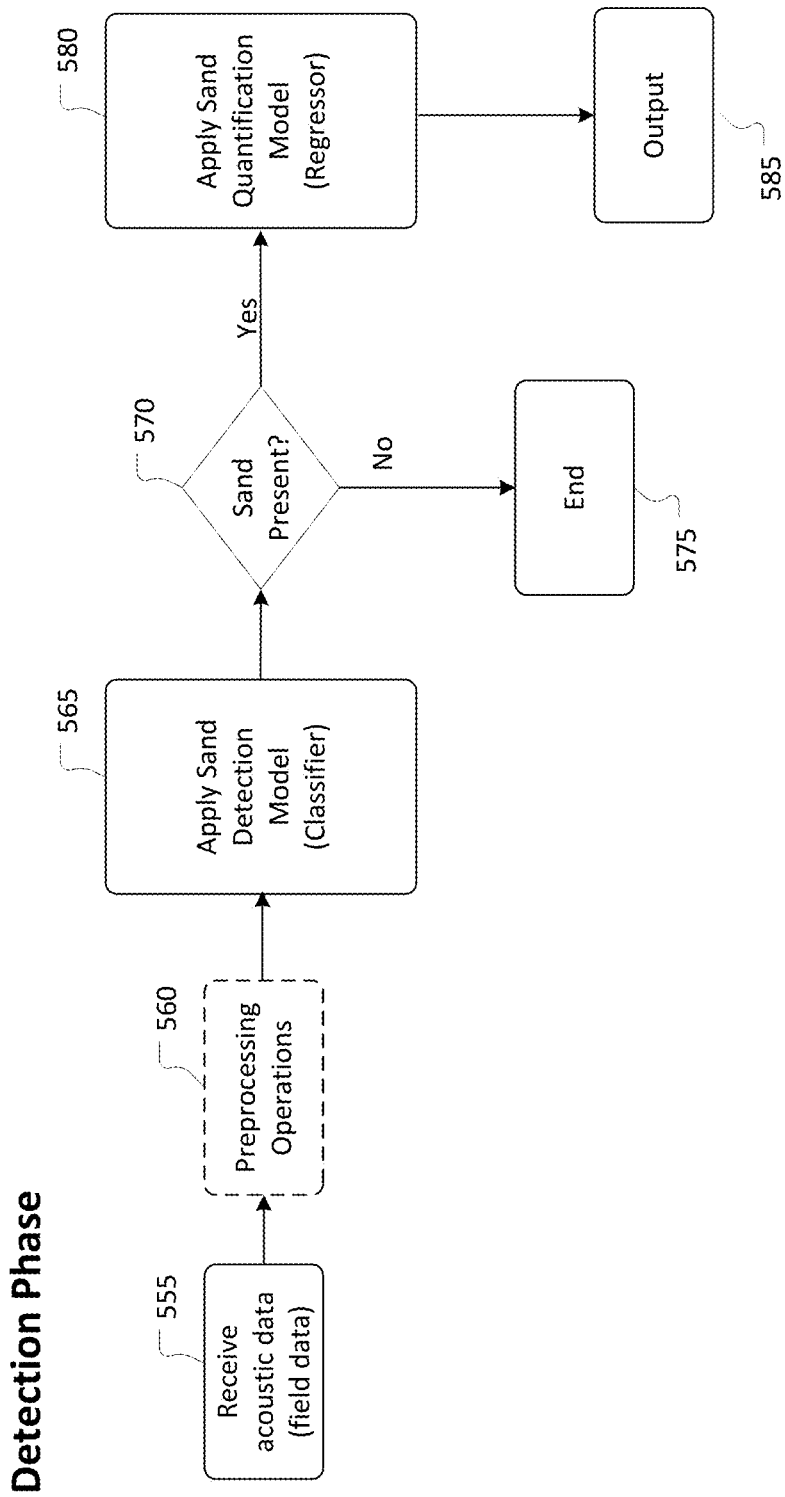

According to various aspects of the subject technology, multiple models (e.g., a classifier and a regressor) may be used to improve accuracy and provide additional insight for making well management decisions. For example, FIGS. 5A and 5B are flow diagrams showing a training phase for a dual model system and a detection phase for using the dual model system, in accordance with various aspects of the subject technology. For the purposes of illustration, FIGS. 5A and 5B are described with respect to certain data (e.g., acoustic data), labels, data transformations, preprocessing steps, and machine learning models. However, other types of data (e.g., vibrational data or other sensor data), labels, data transformations, preprocessing steps, and machine learning models may also be used. Furthermore, although the example of FIGS. 5A and 5B utilize a two model system, additional and/or alternative models may be used in the same or other configurations.

FIG. 5A is a flow diagram of the training phase for generating the sand quantification model. At step 505 the training system receives the acoustic data portion of test data to be used in the training phase. At step 510, the training system performs a number of preprocessing operations to prepare acoustic data for generating the sand detection models (e.g., the sand detection classifier model and the sand quantification regressor model). For example, the training system may calculate the power spectral density (PSD) or power spectrum of each acoustic waveform in the test data and perform one or more smoothing, noise removal, and/or filtering operations on each PSD measurement.

At step 525, the training system may also receive the label data component of the test data. According to some variations, the label data may include values for a presence, amount, or concentration of sand associated with a particular set of acoustic data One or more preprocessing operations may also need to be performed on the label data. For example, in the example of FIG. 5A, the label data initially received at step 525 be a sand percentage value associated with a particular set of acoustic data. At step 530, the training system may convert the sand percentage value to generate a "sand" or "no sand" label. The different label data may be used to build the same or different models for sand detection.

At step 535, the processed acoustic data from step 510 and the sand label from step 530 may then be used to build the sand detection model, which may be a random forest classifier. At step 540, the processed acoustic data from step 510 and the sand percentage label from step 525 may then be used to build the sand quantification model, which may be a random forest regressor.

FIG. 5B is a flow diagram of the detection phase using both the sand detection models generated in FIG. 5A. The detection phase may be performed by one or more devices that make up a detection system. At step 555, the detection system may receive sensor data from a tool (e.g., tool 10 of FIG. 1) deployed in a borehole in which analysis is desired. The sensor data may include acoustic data from sensors on the tool. The acoustic data from the tool may require transformation into a format that can be applied to the sand quantification model. Accordingly, one or more preprocessing operations may be performed on the acoustic data at step 560. For example, the detection system may calculate the power spectral density (PSD) of the acoustic data received from the tool and perform one or more smoothing, noise removal, and/or filtering techniques.

At step 565, the detection system may input the processed acoustic data into the sand detection model (e.g., the random forest classifier model generated in step 535 of FIG. 5A) and generate an output from the sand detection model. The output may be in the form of a sand flow signal that indicates that sand is likely present or not present in the flow based on the received acoustic data from the tool. If sand is not present at step 570, the detection phase may end at step 575 and/or an indication that no sand is present in the flow may be displayed to a production engineer or otherwise provided as output.

If the output of the sand detection model indicates that sand is present, at step 580, the detection system may input the processed acoustic data into the sand quantification model (e.g., the random forest regressor model generated in step 540 of FIG. 5A) and generate an output from the sand quantification model at step 585. The output may be in the form of a sand flow signal that indicates an estimate of the amount, concentration, or percentage of sand that is present in the flow based on the received acoustic data from the tool. The sand flow signal may be provided to an engineer, a well management system, a well maintenance system, or other component. For example, a production engineer may make a decision on scaling back production in order to minimize erosion and/or damage to sand filters or equipment, increasing production if minimal sand is detected, plugging a production zone and/or leak, and/or repairing or replacing sand filters or equipment.

By generating a dual model for sand detection (e.g., the models generated in steps 535 and 540 of FIG. 5A) and using them in the configuration specified in FIG. 5B, a more accurate determination and/or quantification of the sand flow can be made. Furthermore, more efficient use of computing resources (e.g., compute time, processing power, memory, etc.) is achieved based on the configuration specified in FIG. 5B.

Figure 6:
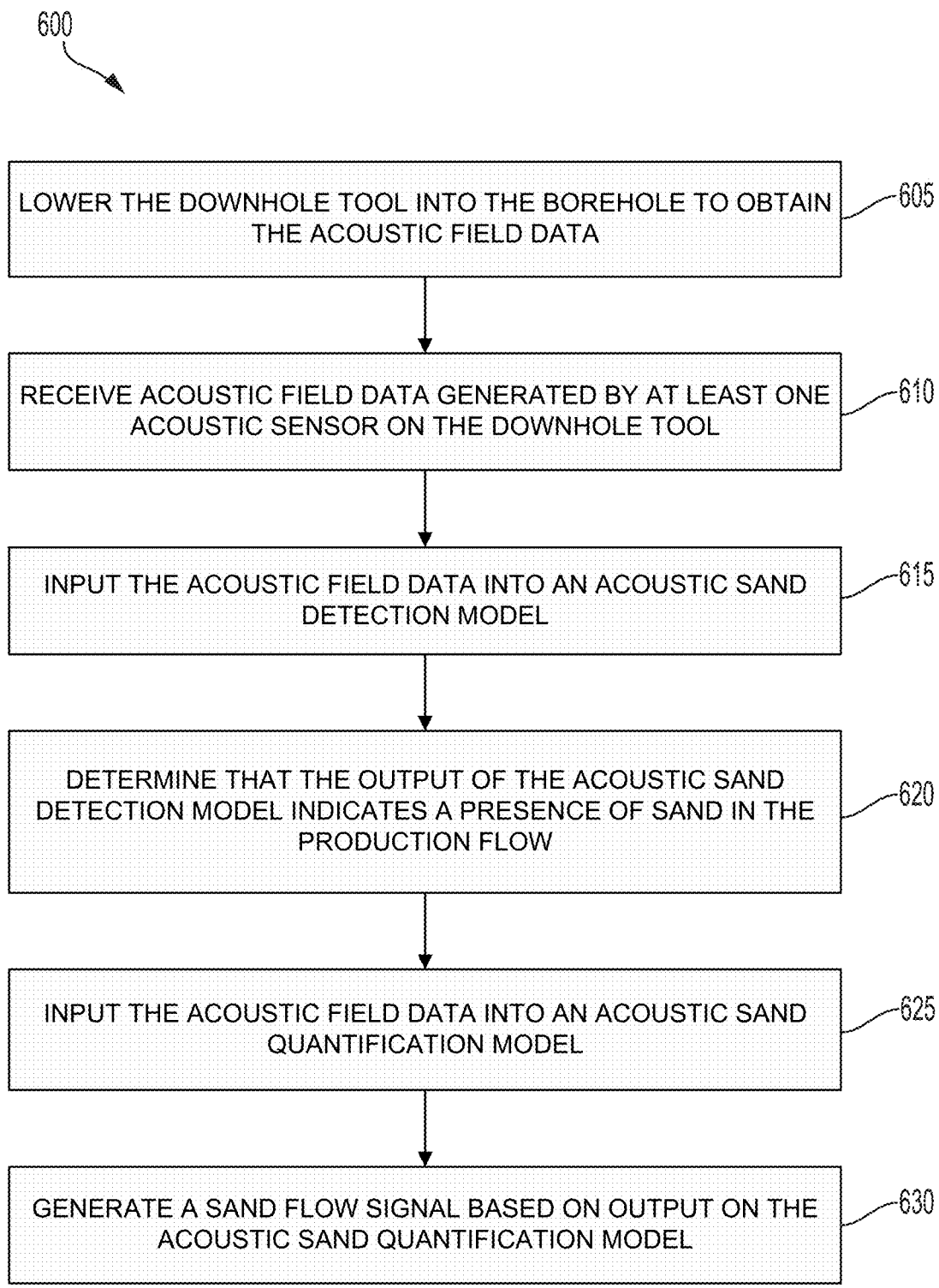
FIG. 6 is a flowchart of an example method for detecting sand in a production flow, in accordance with various aspects of the subject technology.

Having disclosed some example concepts for using sand detection models, the disclosure now turns to FIG. 6, which illustrates an example method 600 detecting sand in a production flow, in accordance with various aspects of the subject technology. The method 600 of FIG. 6 is described in terms of a detection system configured to practice the method. The steps outlined herein are exemplary and can be implemented in any combination thereof, including combinations that exclude, add, or modify certain steps.

At operation 605, a downhole tool may be lowered into a borehole to obtain the acoustic field data. The downhole tool may have a number of sensors including sensors (e.g., a hydrophone) that generate vibrational or acoustic field data. At operation 610, the detection system receives acoustic field data generated by the downhole tool and inputs the acoustic field data into an acoustic sand detection model at operation 615. The acoustic sand detection model outputs an indication of whether sand is detected based on the acoustic field data. At operation 620, if the detection system determines that the acoustic sand detection model indicates the presence of sand in the production flow the acoustic field data may be inputted into an acoustic sand quantification model at operation 625. Based on the output of the acoustic sand quantification model, the detection system may generate a sand flow signal at operation 630. This sand flow signal may be outputted to a display, used to generate a report on the production flow from the borehole, and/or used to perform borehole maintenance or management operations.

Although various aspects of the subject technology have been discussed with respect to the example environment of FIG. 1, other implementations may be applied in other contexts and environments. For example, FIGS. 7A and 7B illustrate an example logging while drilling (LWD) wellbore operating environment and an example downhole environment having tubulars.

Figure 7A:
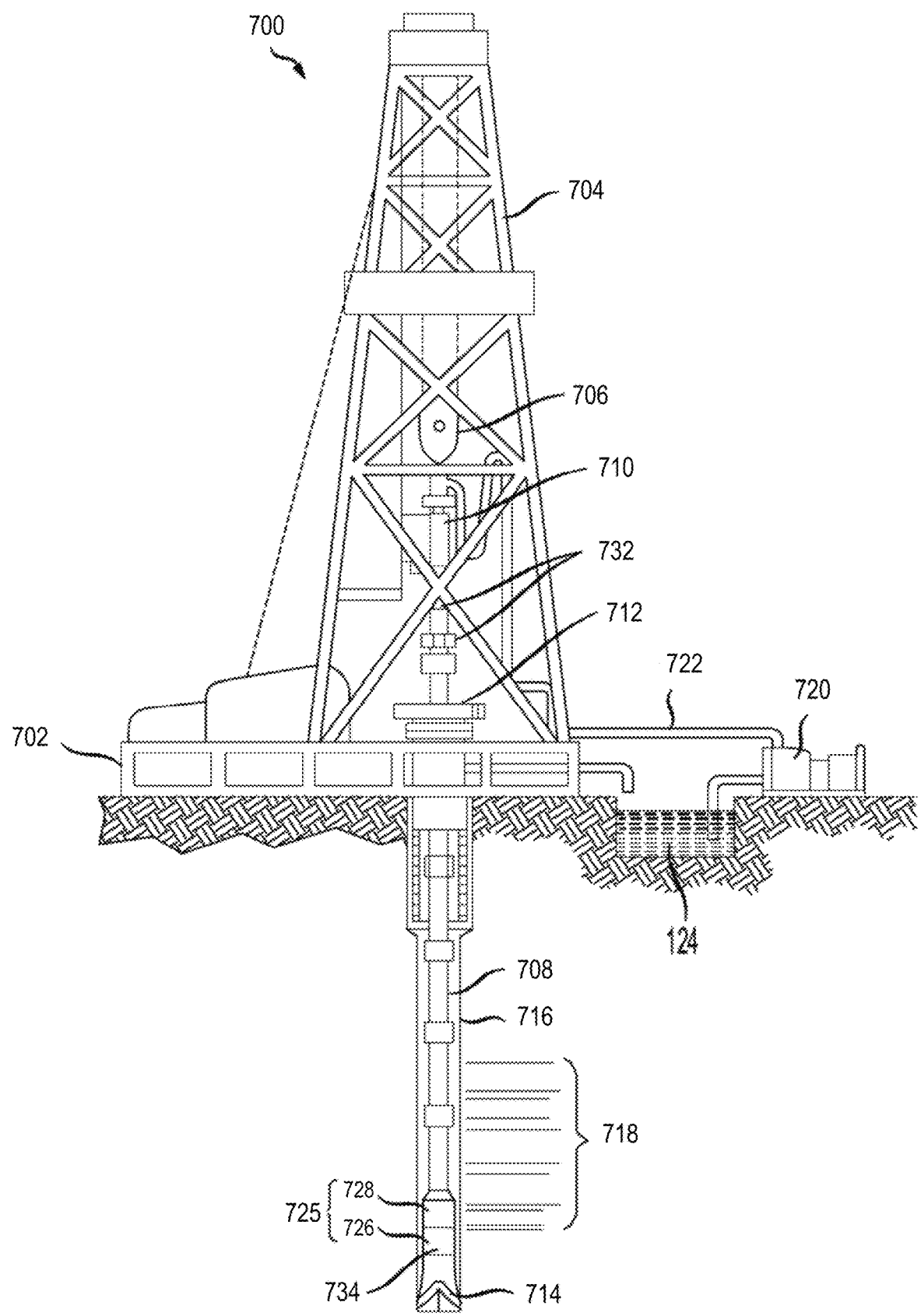
FIG. 7A is a schematic diagram of an example logging while drilling (LWD) wellbore operating environment, in accordance with some examples.
Figure 7B:
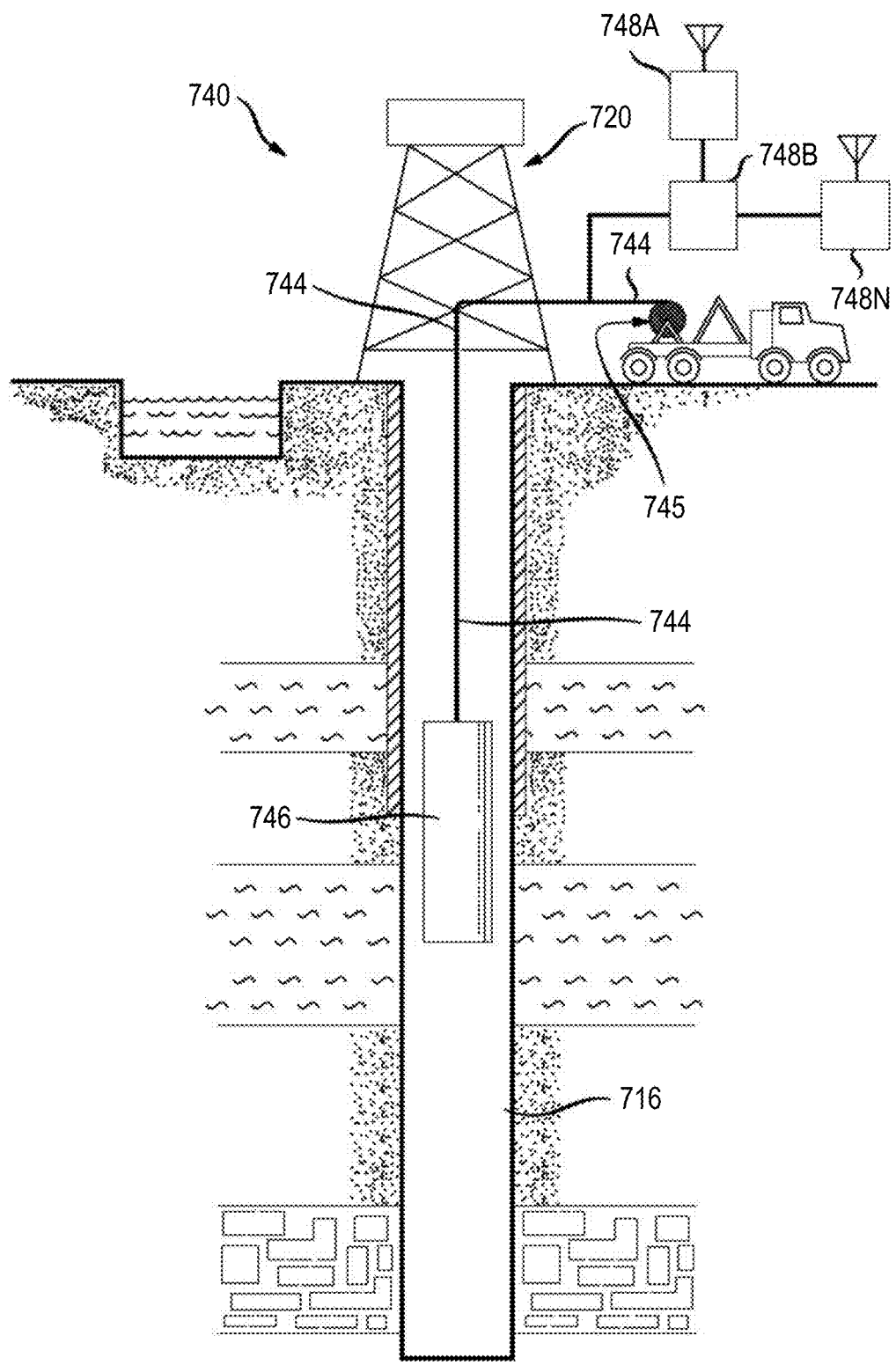
FIG. 7B is a schematic diagram of an example downhole environment having tubulars, in accordance with some examples.

The disclosure now turns to FIG. 7A, which illustrates a schematic view of a logging while drilling (LWD) wellbore operating environment 700 in in accordance with some examples of the present disclosure. As depicted in FIG. 7A, a drilling platform 702 can be equipped with a derrick 704 that supports a hoist 706 for raising and lowering a drill string 708. The hoist 706 suspends a top drive 710 suitable for rotating and lowering the drill string 708 through a well head 712. A drill bit 714 can be connected to the lower end of the drill string 708. As the drill bit 714 rotates, the drill bit 714 creates a wellbore 716 that passes through various formations 718. A pump 720 circulates drilling fluid through a supply pipe 722 to top drive 710, down through the interior of drill string 708 and orifices in drill bit 714, back to the surface via the annulus around drill string 708, and into a retention pit 724. The drilling fluid transports cuttings from the wellbore 716 into the retention pit 724 and aids in maintaining the integrity of the wellbore 716. Various materials can be used for drilling fluid, including oil-based fluids and water-based fluids.

Logging tools 726 can be integrated into the bottom-hole assembly 725 near the drill bit 714. As the drill bit 714 extends the wellbore 716 through the formations 718, logging tools 726 collect measurements relating to various formation properties as well as the orientation of the tool and various other drilling conditions. The bottom-hole assembly 725 may also include a telemetry sub 728 to transfer measurement data to a surface receiver 732 and to receive commands from the surface. In at least some cases, the telemetry sub 728 communicates with a surface receiver 732 using mud pulse telemetry. In some instances, the telemetry sub 728 does not communicate with the surface, but rather stores logging data for later retrieval at the surface when the logging assembly is recovered.

Each of the logging tools 726 may include one or more tool components spaced apart from each other and communicatively coupled with one or more wires and/or other media. The logging tools 726 may also include one or more computing devices 734 communicatively coupled with one or more of the one or more tool components by one or more wires and/or other media. The one or more computing devices 734 may be configured to control or monitor a performance of the tool, process logging data, and/or carry out one or more aspects of the methods and processes of the present disclosure.

In at least some instances, one or more of the logging tools 726 may communicate with a surface receiver 732 by a wire, such as wired drill pipe. In other cases, the one or more of the logging tools 726 may communicate with a surface receiver 732 by wireless signal transmission. In at least some cases, one or more of the logging tools 726 may receive electrical power from a wire that extends to the surface, including wires extending through a wired drill pipe.

Referring to FIG. 7B, an example system 740 for downhole line detection in a downhole environment having tubulars can employ a tool having a tool body 746 in order to carry out logging and/or other operations. For example, instead of using the drill string 708 of FIG. 7A to lower tool body 746, which may contain sensors or other instrumentation for detecting and logging nearby characteristics and conditions of the wellbore 716 and surrounding formation, a wireline conveyance 744 can be used. The tool body 746 can include a resistivity logging tool. The tool body 746 can be lowered into the wellbore 716 by wireline conveyance 744. The wireline conveyance 744 can be anchored in the drill rig 745 or a portable means such as a truck. The wireline conveyance 744 can include one or more wires, slicklines, cables, and/or the like, as well as tubular conveyances such as coiled tubing, joint tubing, or other tubulars.

The illustrated wireline conveyance 744 provides support for the tool, as well as enabling communication between tool processors 748A-N on the surface and providing a power supply. In some examples, the wireline conveyance 744 can include electrical and/or fiber optic cabling for carrying out communications. The wireline conveyance 744 is sufficiently strong and flexible to tether the tool body 746 through the wellbore 716, while also permitting communication through the wireline conveyance 744 to one or more processors 748A-N, which can include local and/or remote processors. Moreover, power can be supplied via the wireline conveyance 744 to meet power requirements of the tool. For slickline or coiled tubing configurations, power can be supplied downhole with a battery or via a downhole generator.

Figure 8:
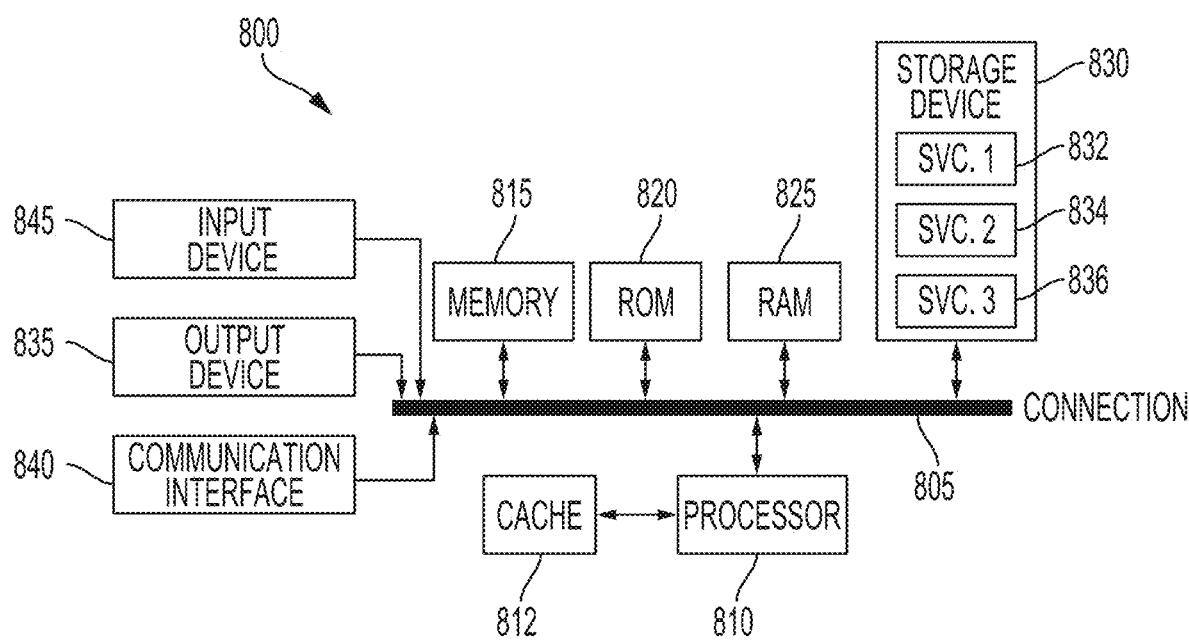
FIG. 8 is a schematic diagram of an example computing device architecture, in accordance with some examples.

FIG. 8, which illustrates an example computing device architecture 800 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 8 illustrates an example computing device architecture 800 of a computing device which can implement the various technologies and techniques described herein. For example, the computing device architecture 800 can implement the various training systems, detection systems, data processors, downhole tools, servers, or other computing devices and perform various steps, methods, and techniques disclosed herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising receiving acoustic field data generated by at least one acoustic sensor on a downhole tool lowered into a borehole of a production flow; inputting the acoustic field data into an acoustic sand detection model; and generating a sand flow signal based on output of the acoustic sand detection model.

Statement 2: A method according to Statement 1, wherein the sand flow signal is a determination of whether sand is detected in the production flow.

Statement 3: A method according to any of Statements 1 and 2, wherein the acoustic sand detection model is a random forest classifier model.

Statement 4: A method according to any of Statements 1 through 3, further comprising inputting, when the output of the acoustic sand detection model indicates a presence of sand in the production flow, the acoustic field data into an acoustic sand quantification model.

Statement 5: A method according to any of Statements 1 through 4, wherein the acoustic sand quantification model is a random forest regressor model.

Statement 6: A method according to any of Statements 1 through 5, wherein the sand flow signal is a concentration of sand detected in the production flow.

Statement 7: A method according to any of Statements 1 through 6, further comprising transmitting the sand flow signal to a display interface.

Statement 8: A method according to any of Statements 1 through 7, wherein the inputting of the acoustic field data into the acoustic sand detection model comprises calculating a power spectral density measurement for the acoustic field data; and inputting the power spectral density measurement into the acoustic sand detection model.

Statement 9: A method according to any of Statements 1 through 8, wherein further comprising performing at least one operation for smoothing, removing noise, or filtering the power spectral density measurement.

Statement 10: A method according to any of Statements 1 through 9, further comprising lowering the downhole tool into the borehole to obtain the acoustic field data.

Statement 11: A method according to any of Statements 1 through 10, wherein the at least one acoustic sensor includes a hydrophone.

Statement 12: A system comprising one or more processors and at least one computer-readable storage medium having stored therein instructions which, when executed by the one or more processors, cause the system to: receive vibrational data generated by at least one sensor on a downhole tool lowered into a borehole of a production flow; apply a sand detection model to the vibrational data to generate an output; generate a sand flow signal based on the output of the sand detection model; and transmit the sand flow signal to a display interface.

In some aspects, the sand detection model is a random forest classifier model and wherein the sand flow signal is a determination of whether sand is detected in the production flow. In some aspects, the instructions further cause the system to input, when the output of the sand detection model indicates a presence of sand in the production flow, the vibrational data into an sand quantification model, wherein the sand quantification model is a random forest regressor model. In some aspects, the sand flow signal is a concentration of sand detected in the production flow. In some aspects, the instructions further cause the system to: calculate a power spectral density measurement for the vibrational data; and input the power spectral density measurement into the sand detection model. In some aspects, the at least one sensor includes a hydrophone.

Statement 13: A non-transitory computer-readable storage medium comprising instructions stored on the non-transitory computer-readable storage medium, the instructions, when executed by one more processors, cause the one or more processors to: receive sensor data generated by at least one sensor on a downhole tool lowered into a borehole of a production flow; apply a sand detection model to the sensor data to generate an output; and generate a sand flow signal based on the output of the sand detection model.

In some aspects, the at least one sensor includes a hydrophone and wherein the sensor data includes vibrational data from the hydrophone. In some aspects, the instructions further cause the one or more processors to: calculate a power spectral density measurement for the sensor data; and input the power spectral density measurement into the sand detection model.

Statement 14: A system comprising means for performing a method according to any of Statements 1 through 11.

What is claimed is:

1. A method comprising:
storing a plurality of datasets, wherein:
each respective dataset of the plurality of datasets is labeled with a respective label that identifies a sand flow rate and an orifice size, and
a first set of label data of the respective labels identifies that a first dataset of the plurality of datasets is associated with a first sand flow rate and a first orifice size;
controlling movement of at least one acoustic sensor along a borehole based on operation of a conveyance, wherein the movement of the at least one acoustic sensor is controlled based on operation of a well management system that includes a memory, one or more processors that execute instructions out of the memory, at least one input coupled to the at least one acoustic sensor, and at least one output communicatively coupled to the conveyance;
sensing acoustic field data by the at least one acoustic sensor when the at least one acoustic sensor is controlled by the conveyance to move to borehole locations that include a first borehole location, wherein the acoustic field data is associated with a production flow of the borehole and the acoustic field data is received by the one or more processors of the well management system via the at least one input;
performing a plurality of simulations to generate a machine learning sand detection model based on each of the respective datasets being labeled with the respective labels that identify the sand flow rate and the orifice size, wherein a first simulation of the plurality of simulations is performed according to parameter settings that correspond to the first sand flow rate and the first orifice size of the first set of label data;
training the machine learning sand detection model with a first portion of a designated number of data subsets to improve operation of the machine learning sand detection model;
testing the machine learning sand detection model with a second portion of the designated number of data subsets to validate the improved operation of the machine learning sand detection model;
identifying that the acoustic field data corresponds to the first dataset based on operation of the machine learning sand detection model and the first simulation being performed according to the parameter settings that correspond to the first sand flow rate and the first orifice size of the first set of label data;
generating a sand flow signal associated with a current sand flow rate at the first location of the borehole based on the first set of label data that corresponds to the first sand flow rate and the first orifice size; and
performing at least one action of changing the current sand flow rate, scaling back production, plugging a production zone, and repairing or replacing a piece of equipment based on the sand flow signal.

2. The method of claim 1, wherein the machine learning sand detection model is a random forest classifier model.

3. The method of claim 1, further comprising providing the acoustic field data for training of a machine learning acoustic sand quantification model based on the indication that the sand is detected in the production flow.

4. The method of claim 3, wherein the machine learning acoustic sand quantification model is a random forest regressor model.

5. The method of claim 1, wherein the sand flow signal identifies a concentration of the sand detected in the production flow and the at least one action results in a change to the current sand flow rate.

6. The method of claim 1, further comprising transmitting the sand flow signal to a display interface.

7. The method of claim 1, further comprising:
providing the acoustic field data to a processor executing instructions of the machine learning sand detection model, wherein the movement of the at least one acoustic sensor is controlled to sense the acoustic field data at the first location of the borehole where a sand flow source is located, and the processor executes the instructions of the machine learning sand detection model to:
subtract acoustic data sensed a second location of the borehole from the acoustic field data to remove noise from the acoustic field data to generate a smoothed set of acoustic field data,
calculate a power spectral density measurement for the smoothed set of acoustic field data; and
provide the power spectral density measurement as an input affecting operation of the machine learning sand detection model.

8. The method of claim 1, further comprising:
receiving a first set of acoustic data at the first borehole location by the at least one acoustic sensor, wherein the received acoustic field data is received when the at least one acoustic sensor is located at a second location of the borehole; and
subtracting the first set of acoustic data from the acoustic field data to remove noise from the acoustic field data.

9. The method of claim 1, further comprising:
partitioning test data into the designated number of data subsets, wherein:
the first portion of the designated number of data subsets include all but a last data subset of the designated number of data subsets, and
the second portion of the designated number of data subsets includes the last data subset of the designated number of data subsets; and
training the machine learning sand detection model with a third portion of the designated number of data subsets to improve operation of the machine learning sand detection model, wherein the third portion of the designated number of data subsets includes all but a second to last data subset of the designated number of data subsets; and
testing the machine learning sand detection model with the second to last data subset of the designated number of data subsets to validate the improved operation of the machine learning sand detection model.

10. The method of claim 9, wherein the test data includes each of the respective datasets of the plurality of datasets.

11. A system comprising:
a downhole tool that includes at least one sensor;
a conveyance that lowers the downhole tool into a borehole;
one or more processors of a well management system that receive data from the at least one sensor via an input of the well management system; and
at least one computer-readable storage-medium having stored therein instructions which, when executed by the one or more processors, cause the system to:
store a plurality of datasets, wherein:
each respective dataset of the plurality of datasets is labeled with a respective label that identifies a sand flow rate and an orifice size, and
a first set of label data of the respective labels identifies that a first dataset of the plurality of datasets is associated with a first sand flow rate and a first orifice size;
control movement of at least one acoustic sensor along a borehole based on operation of a conveyance, wherein the movement of the at least one acoustic sensor is controlled based on the one or more processors being communicatively coupled to the at least one acoustic sensor and based on at least one output of the well management system being communicatively coupled to the conveyance;
receive acoustic field data sensed by the at least one sensor when the at least one acoustic sensor is controlled by the conveyance to move to borehole locations that include a first location of the borehole, wherein the acoustic field data is associated with a production flow of the borehole;
perform a plurality of simulations to generate a machine learning sand detection model based on each of the respective datasets being labeled with the respective labels that identify the sand flow rate and the orifice size, wherein a first simulation of the plurality of simulations is performed according to parameter settings that correspond to the first sand flow rate and the first orifice size of the first set of label data;
train the machine learning sand detection model with a first portion of a designated number of data subsets to improve operation of the machine learning sand detection model;
test the machine learning sand detection model with a second portion of the designated number of data subsets to validate the improved operation of the machine learning sand detection model;
apply the machine learning sand detection model to the acoustic field data to identify that the acoustic field data corresponds to the first dataset based on operation of the machine learning sand detection model and the first simulation being performed according to the parameter settings that correspond to the first sand flow rate and the first orifice size of the first set of label data;
generate a sand flow signal associated with a current sand flow rate at the first location of the borehole based on the first set of label data that corresponds to the first sand flow rate and the first orifice size; and
performing at least one action of changing the current sand flow rate, scaling back production, plugging a production zone, and repairing or replacing a piece of equipment based on the sand flow signal.

12. The system of claim 11, wherein the machine learning sand detection model is a random forest classifier model.

13. The system of claim 12, wherein the instructions further cause the system to:
provide vibrational data for training of a machine learning acoustic sand quantification model based on the indication that the sand is detected in the production flow, wherein the machine learning acoustic sand quantification model is a random forest regressor model.

14. The system of claim 11, wherein the sand flow signal identifies a concentration of sand detected in the production flow and the at least one action results in a change to the current sand flow rate.

15. The system of claim 11, wherein the instructions further cause the system to:
calculate a power spectral density measurement for the acoustic field data; and
input the power spectral density measurement into the machine learning sand detection model.

16. The system of claim 11, wherein the at least one sensor includes a hydrophone.

17. A non-transitory computer-readable storage medium comprising:
instructions stored on the non-transitory computer-readable storage medium, the instructions, when executed by one or more processors, cause the one or more processors to:
store a plurality of datasets, wherein:
each respective dataset of the plurality of datasets is labeled with a respective label that identifies a sand flow rate and an orifice size, and
a first set of label data of the respective labels identifies that a first dataset of the plurality of datasets is associated with a first sand flow rate and a first orifice size;
control movement of at least one acoustic sensor along a borehole based on operation of a conveyance, wherein the movement of the at least one acoustic sensor is controlled based on operation of a well management system that includes the one or more processors, at least one input coupled to the at least one acoustic sensor, and at least one output communicatively coupled to the conveyance;
receive acoustic field data sensed by the at least one acoustic sensor when the at least one acoustic sensor is controlled by the conveyance to move to borehole locations that include a first location of the borehole, wherein the acoustic field data is received via at least one input coupled to the at least one acoustic sensor;
perform a plurality of simulations to generate a machine learning sand detection model based on each of the respective datasets being labeled with the respective labels that identify the sand flow rate and the orifice size, wherein a first simulation of the plurality of simulations is performed according to parameter settings that correspond to the first sand flow rate and the first orifice size of the first set of label data;
train the machine learning sand detection model with a first portion of a designated number of data subsets to improve operation of the machine learning sand detection model;
test the machine learning sand detection model with a second portion of the designated number of data subsets to validate the improved operation of the machine learning sand detection model;
apply the machine learning sand detection model to the acoustic field data to identify that the acoustic field data corresponds to the first dataset based on the machine learning sand detection model and the first simulation being performed according to the parameter settings that correspond to the first sand flow rate and the first orifice size of the first set of label data;
generate a sand flow signal associated with a current sand flow rate at the first location of the borehole based on the first set of label data that corresponds to the first sand flow rate and the first orifice size; and
performing at least one action of changing the current sand flow rate, scaling back production, plugging a production zone, and repairing or replacing a piece of equipment based on the sand flow signal.

18. The non-transitory computer-readable storage medium of claim 17, wherein the at least one sensor includes a hydrophone and wherein the acoustic field data includes vibrational data from the hydrophone.

19. The non-transitory computer-readable storage medium of claim 17, wherein the instructions further cause the one or more processors to:
calculate a power spectral density measurement for the acoustic field data; and
provide the power spectral density measurement as an input affection operation of the machine learning sand detection model.

20. The method of claim 1, wherein the current sand flow rate is changed based on the sand flow signal when a repair of wellbore production equipment is performed.

* * * * *